United States Patent [19]
Pellicano

[11] 3,944,122
[45] Mar. 16, 1976

[54] DEVICE FOR GUIDING THE MAGNETIC TAPE IN MAGNETIC TAPE HANDLING APPARATUS

[75] Inventor: Emilio Pellicano, Milan, Italy

[73] Assignee: Honeywell Information Systems Italia, Caluso, Italy

[22] Filed: Jan. 2, 1974

[21] Appl. No.: 430,250

[30] Foreign Application Priority Data
Dec. 29, 1972   Italy .................................. 33776/72

[52] U.S. Cl. .................................. 226/198; 242/76
[51] Int. Cl.² ........................................ B65H 23/32
[58] Field of Search ........... 226/196, 197, 198, 199; 242/76

[56] References Cited
UNITED STATES PATENTS

| | | | |
|---|---|---|---|
| 2,742,283 | 4/1956 | Rivas .................................. | 226/198 |
| 2,782,029 | 2/1957 | Uritis .................................. | 242/76 |
| 3,074,310 | 1/1963 | Kotte .................................. | 226/196 X |
| 3,143,270 | 8/1964 | Cohen .................................. | 226/196 |
| 3,179,318 | 4/1965 | Blom .................................. | 226/196 |
| 3,181,808 | 5/1965 | Ireland .................................. | 242/76 |
| 3,375,963 | 4/1968 | Wang .................................. | 226/198 X |
| 3,443,273 | 5/1969 | Arch .................................. | 226/198 |
| 3,768,717 | 10/1973 | Salcedo .................................. | 226/198 |
| 3,799,422 | 3/1974 | Matsumoto .................................. | 226/196 |

*Primary Examiner*—Richard A. Schacher
*Attorney, Agent, or Firm*—Fred Jacob

[57] ABSTRACT

This disclosure relates to a guidance arrangement for web handler, for example of the type used for moving an elongated tape. A direction modifying idler roller has associated therewith means for maintaining the alignment of a tape with tape receiving and dispensing members disposed on opposite sides of the roller irrespective of any misalignment of the roller. Basically, the tape guidance means includes a fixed member having arcuate tape guide surfaces over which the tape slides and each guide surface having associated therewith shoulders which are resiliently mounted and which engage opposite edges of the tape.

8 Claims, 3 Drawing Figures

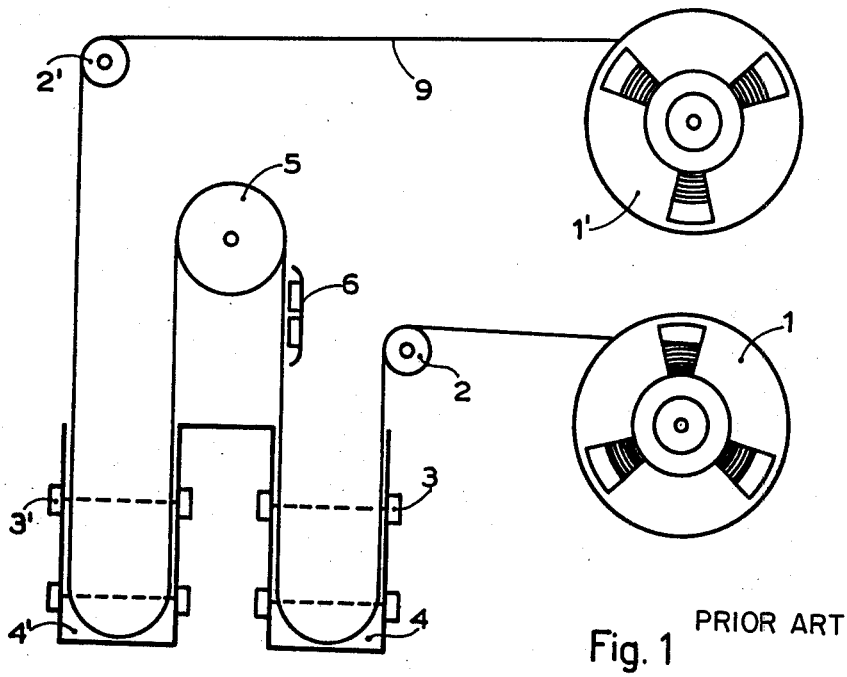
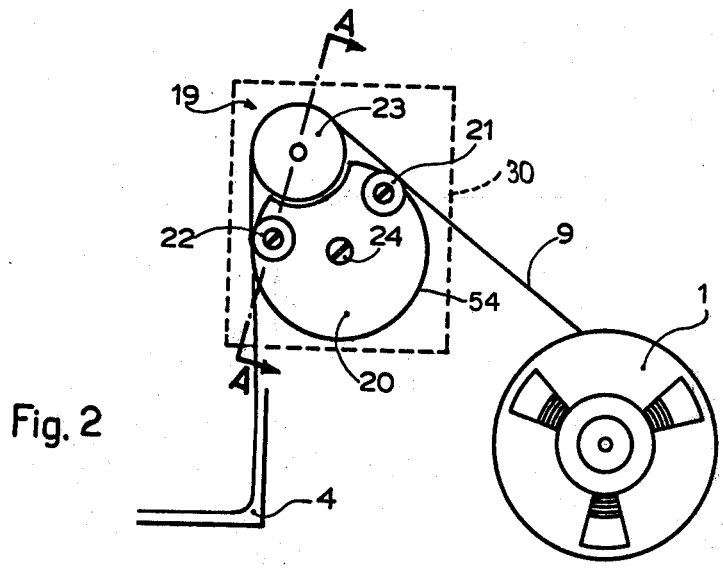
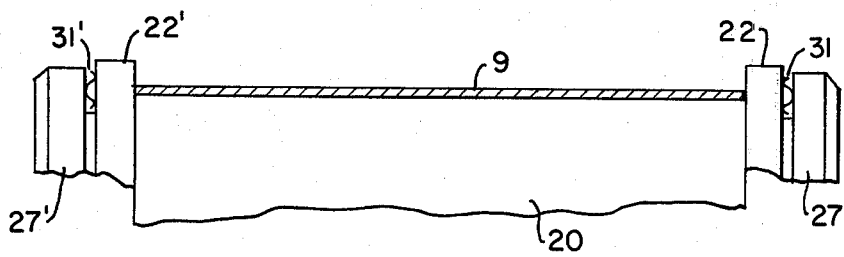
Fig. 1 PRIOR ART
Fig. 2
Fig. 5

DEVICE FOR GUIDING THE MAGNETIC TAPE IN MAGNETIC TAPE HANDLING APPARATUS

This invention relates to a device for guiding an elongated web, for example for guiding tape in a magnetic tape handling apparatus.

BACKGROUND OF THE INVENTION

Usually whenever a driven tape must change its direction, it is wound either around fixed guiding members or, if the winding angle around such guiding members is relevant, around rotating rollers, also called idlers. In the arrangement in question, the friction between the tape and a fixed guiding member would cause traction and wear values not to be tolerated.

In tape handlers of the type under consideration here, particularly high speed magnetic tape handlers provided with buffer vacuum chambers, the guiding members are usually idler rollers provided with guiding shoulders in consideration of the speed and the high value of the winding angle.

This system, however, has some drawbacks, which can be summed up in the difficulty of completely removing the axial clearance between the rotating and the fixed part of the guiding member, and in the difficulty of adjusting the rollers to be perfectly perpendicular to a reference plane, which is usually the internal wall of the vacuum chamber. Therefore, the edges of the tapes are subject to deterioration as the surfaces for axially limiting the motion of the tape are close to the roller.

SUMMARY OF THE INVENTION

The present invention provides a guiding device for such tape handlers which obviates the above indicated disadvantages and which allows easy and accurate reciprocal positioning of the guiding member, the tape and the main frame of the apparatus.

The guiding device according to the invention comprises a guiding body of suitable shape and size, located in proximity of an idling roller, in such a way, that the tape, before and after the roller, is wound through a small angle around the guiding body.

The positioning of the tape in a direction transverse to the tape path, which is in no way limited by the roller. Such transverse positioning is obtained by means of guiding shoulders which are located adjacent to surface portions of the guiding body over which the tape passes and which are preferably mounted on the guiding body itself.

This guiding member is easily fixed to the main frame of the apparatus, and allows the precise alignment of the guiding shoulders with respect to the walls of the vacuum chambers.

With the above and other objects in mind, as will hereinafter appear in greater detail, the nature of the invention will be more clearly understood by reference to the following detailed description, the appended claims and the several views illustrated in the accompanying drawings:

IN THE DRAWINGS:

FIG. 1 is a schematic view and shows the path of the tape in prior art magnetic tape handling apparatus.

FIG. 2 is a schematic front view of a tape guiding device according to the invention, and also shows a portion of the tape path near to the device.

Figure 3:
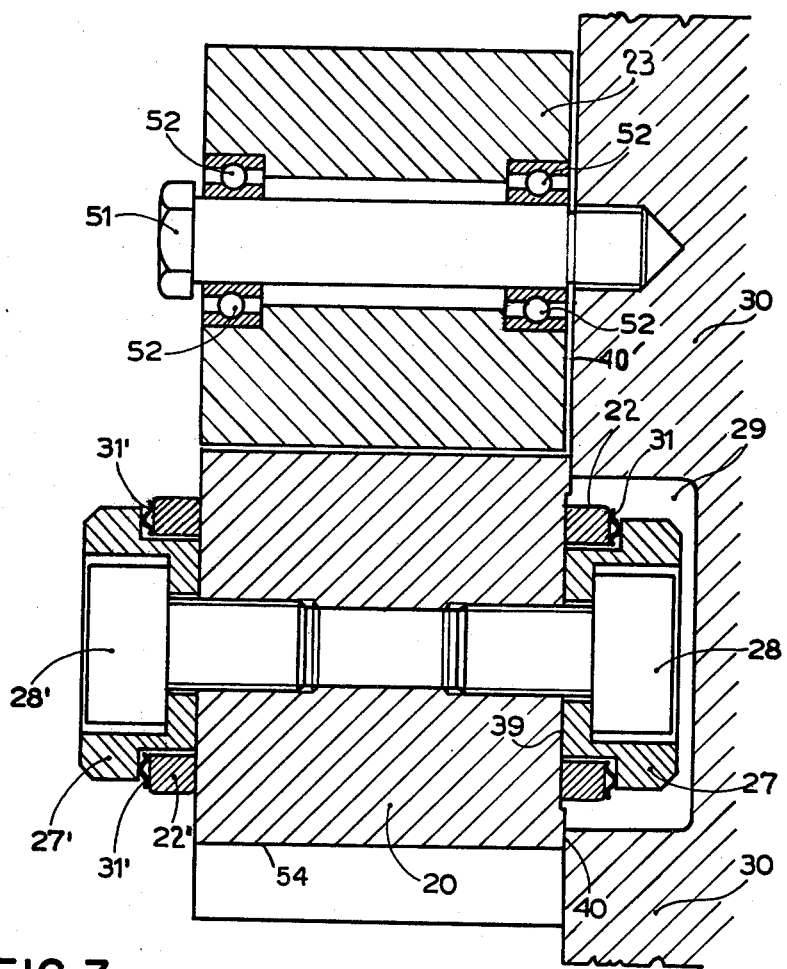
FIG. 3 is an enlarged fragmentary sectional view of the device of FIG. 2, taken generally along the section line A—A thereof, the tape being omitted.
Figure 4:
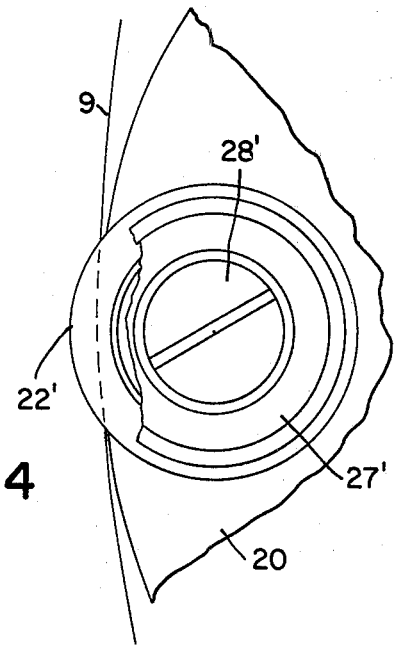

In FIG. 1 the path of a magnetic tape 9 in prior art magnetic tape handling and recording apparatus is schematically indicated; the tape 9 being unwound from tape reel 1 and passing around a tape guiding device 2 to a vacuum chamber 4, which is provided with photoelectric means 3 for signalling the presence of the tape in the interior of the vacuum chamber. The tape, coming out of the first vacuum chamber 4, passes under an assembly 6 of read-write heads, is seized by a capstan 5 and sent to a second vacuum chamber 4', and finally through a second tape guiding device 2' after which it is wound up on reel 1'. During the re-winding of the tape and whenever the tape reels 1 and 1' exchange their respective functions, the path of movement of the tape is in the opposite direction, that is, from reel 1' to reel 1.

The capstan 5 has the object of handling the movement of the tape in the vicinity of the head assembly 6 and the vacuum chambers 4 and 4' develop traction sufficient to prevent the tape from slipping with respect to the capstan. The vacuum chambers also serve as buffers for isolating within certain limits the speed of the tape, imposed by the capstan, from the speed of the reels 1 and 1'.

It may be seen that the guiding device 2, usually in the form of a guiding roller, is located in close proximity to the opening of the vacuum chamber 4 and may subject the tape to a considerable winding angle to cause the above described undesirable conditions. The use of a fixed pivot, as stated, would cause yet more serious problems.

According to the present invention, these prior art guiding devices are replaced by a novel device, as shown in FIG. 2, wherein a portion of the path of the tape 9 is fed from reel 1 and is directed toward the vacuum chamber 4 by means of a guiding device 19.

The guiding device 19 includes a main body 20 circumscribed by an arcuate guide surface 54. For ease of manufacture, the body 20 may take the form of a cylinder, having a height slightly greater than the width of the tape 9, and slightly smaller than the width of the vacuum chamber. These differences are on the order of a tenth of a millimeter (4 mils). The main body 20 is provided with a recess 39 partially formed in the plane surface contacting the reference plane 40 of a supporting member or plate 30. The depth of this recess is very small, preferably not over a tenth of a millimeter. A bigger recess 29 is formed on the supporting plate 30 for the main body 20. Pairs of guiding shoulders 21 and 22, preferably formed of ceramic material, are mounted on the main body 20, partially protruding radially from the circular outline of the body. In each pair of shoulders, one shoulder is located at the recess 39, and the other one on the opposite plane surface of the main cylindrical body 20. Therefore, the tape is held in place and freely guided between the shoulders 21, 22 in proximity of the input opening of the vacuum chamber 4, and the tape edges do not touch the vacuum chamber walls.

The guiding shoulders are fixed to the body as described hereinafter. Between the pairs of the guiding shoulders 21 and 22, the arcuate guide surface 54 of body 20 has a recess, partly circular in outline which partially receives therein in mating relationship an idling roller 23. The latter is not provided with guides and is preferably of a width greater than the tape.

The body 20 is fastened to a main frame of the tape.

The path of the tape 9 wound out from the reel 1 will now be considered. The tape is seized and guided by the pair of guiding shoulders 21. In order to allow effective transverse guiding of the tape in cooperation with the shoulders, the tape contacts a portion of the arcuate surface 54 in advance of the roller 23. Such contact extends only through a limited winding angle, which does not cause any appreciable friction, but which is sufficient to insure the transverse stiffening of the tape to enable the shoulders to exert an effective guiding action.

After it leaves the contacted surface portion in the vicinity of the guiding shoulders 21, the tape 9 winds around the idling roller 23 and enters between the pair of shoulders 22. Here again transverse stiffening of the tape is assured by contact with a portion of the arcuate surface 54 extending through a small winding angle, transverse guiding action of the tape being effected in cooperation with the shoulders 22.

It will be apparent that on that portion of the path of the tape 9, between the pairs of shoulders 21 and 22, the guiding action of these shoulders is the more effective the closer they are to the roller 23.

By this arrangement, possible axial displacement and a limited departure of the roller 23 from perpendicularity with the reference surface do not cause any damage to the tape edges entering the vacuum chamber. This is due to the action of the guiding shoulders 21 and 22, which accurately align the tape with the walls of the vacuum chamber. It will be understood that the same guiding action is carried out by the shoulders 21,22 in the case where the direction of tape movement is reversed and the tape emerges from vacuum chamber 4.

It should be noted that in FIG. 2 the body 20 and the roller 23 are shown in magnified dimension with respect to the dimensions of the other elements, such as the tape reel 1 and the vacuum chamber 4. The purpose of such representation is to clearly show the shape and the operation of the device. Actually, the main body 20 may have a diameter of appr. 22 mm (appr. ⅞ inch) and the idling roller a diameter of appr. 13 mm. (appr. ½ inch), whereas the reel may have a diameter of 300 mm (1 foot approximately).

As stated heretofore, the main body 20 is fastened to the main frame of the tape handling apparatus, for instance, by the screw 24. In order to obtain correct operation of the device according to the invention, it is apparent that the guiding shoulders 21,22 must be perfectly aligned with the edges of the walls of the vacuum chamber 4. This alignment is obtained as shown in FIG. 3.

The recess 29 in the supporting plate of the tape unit provides clearance for a bushing 27, a mounting screw 28, an elastic member 31 and the respective guiding shoulder 22. Corresponding elements are mounted on the other face of the body 20. The shoulder components on the opposite side of the body 20 include a shoulder 22', a bushing 27', a mounting screw 28', and an elastic member 31'.

The screws 28 and 28' fasten to the body 20 the respective bushings 27 and 27' which resiliently hold the shoulders 22 and 22' against the body 20, through the interposition of the elastic elements 31 and 31'. These elastic elements, which may be cup cross sectional springs, provide for a stable position of the ceramic shoulders 22,22' without subjecting them to damage and insure their resting on the adjacent surface of the body similar to that illustrated and described with respect to the shoulders 22,22'.

In FIG. 3 the cross-section 50 of the idling roller 23 is also shown. The roller 23 is fastened on the supporting plate 30 of the main frame of the tape unit by means of a pivot 51 carrying two roller bearings 52.

In the working position of the apparatus, the body 20, on that side having the recesses 39 therein, rests on a reference plane 40 of the main frame of the tape unit. This plane 40 is also the reference plane for the inner edge of the vacuum chamber 4, which therefore is precisely aligned to the guiding shoulder 22 positioned in the recess 29. As the thickness of the main body 20 and the depth of the recess 39 may be easily machined to high precision, it follows that also the other guiding shoulder 22 is precisely aligned with the external edge of the wall of the vacuum chamber 4.

It will be apparent from the above description that the simplicity and the functionality of this arrangement provide very precise guiding of the tape without incurring any marked difficulties of construction. The tape guiding function is carried out by the action of the guiding shoulders in cooperation with the tape contacting portions of the arcuate guide surface 54, along the tape path both before and after the idling roller 23. The latter, although located in immediate proximity to the arcuate guide surface, is separate therefrom and hence from the body 20, and itself lacks tape edge guiding means. Thus, any lateral motion of the tape caused by axial displacement of the idling roller 23 and by perpendicularity defects of the latter, are corrected on the spot without causing damage to the edges of the tape. This is accomplished by the action of the guiding ceramic shoulders secured to the body 20, which in turn is fastened to the main plate of the tape unit and has no lateral play.

An important feature of this guiding device is that the body 20 may be mounted on the main frame of the tape unit in such a way (FIG. 2) that the guiding shoulders 22,22' may be very close to the opening of the vacuum chamber 4, thereby enhancing the precision with which the magnetic tape is guided into the vacuum chamber and out of the same, and protecting the walls of the chamber 4 from any wear.

In addition, the high speed motion of the magnetic tape on the arcuate guide surface 54 of the body 20 causes an air cushion to become interposed between the tape surface and the arcuate guide surface, thus substantially reducing the friction between these surfaces and the resultant tape wear.

Moreover, the ability of easily removing and positioning the body 20 on the main frame of the tape unit allows for any desired special treatment of the arcuate guide surface, such as surface hardening and lapping, so as to reduce friction and tape wear to a minimum value.

Alternatively, in place of the individual fastening screws for each guiding shoulder, a clamping device may be used comprising, for example, a screw passing through the body and an associated nut. The pairs of ceramic shoulders 21,22 may also be cemented to the body 20 by means of epoxy resins and similar means.

It will be apparent that the fastening of the body 20 to the main frame may be carried out by using the same screws provided for clamping the guiding shoulders. In the latter case, referring to FIG. 3, the screw 28' may extend into the frame 30 and the positioning of the guiding shoulder 22 may be obtained by a compression spring acting between the frame 30 and the shoulder 22.

It is also to be noted that the guiding shoulders are preferably mounted on the body 20, but may also, alternatively, be fastened to different supports. For instance, they may be attached to the main frame on one side of the tape path and to the lid of the vacuum chamber 4 on the other side of the tape path, or alternatively to other different supporting members. In other words, it is possible to render mechanically independent the three elements which constitute the device, that is, the guiding shoulders, the guiding body and the idling roller, provided that the mounting system adopted ensures the respective positioning and the desired function of said elements.

The device according to the invention, in addition to providing the already mentioned advantages for positioning and guiding the tape, requires only a minimal amount of space and may therefore be used with advantage in all units where structural compactness is an essential requirement.

Although the essential features of the invention have been explained in the preceding description, and represented in the annexed drawings, it is intended that any one skilled in the art may carry on any modifications of shape and of details, which may be deemed useful, without thereby departing from the spirit and scope of the invention.

I claim:

1. In apparatus for handling an elongated tape, tape guiding means including the combination of a tape direction modifying roller and a guide unit, said roller being free of tape edge guidance means, said guide unit comprising a fixed arcuate guide surface positioned immediately adjacent said roller and including a pair of tape contacting surface portions straddling said roller along the path of said tape, said surface portions being adapted to provide guiding engagement with said tape through a limited wrapping angle and having a dimension in a direction transverse to said tape path slightly in excess of the width of said tape, and separate edge guiding shoulders spaced in said transverse direction to accept said arcuate guide surface therebetween for transversely aligning said tape immediately adjacent said roller.

2. The apparatus of claim 1 wherein each shoulder is resiliently mounted and constantly urged towards said body.

3. The apparatus of claim 1 wherein each shoulder is in the form of a ring member and futher including a centering bushing supporting said ring member, and an axially operative resilient member between said bushing and said ring member for urging said ring member against said body.

4. The apparatus of claim 1 wherein said guiding shoulders are in the form of rings formed of ceramic material.

5. The apparatus of claim 1 wherein said arcuate surface circumscribes a fixedly mounted body and each guiding shoulder is mounted on said body.

6. The apparatus of claim 1 wherein said arcuate surface circumscribes a fixedly mounted body, said roller and said body being independently mounted on a common reference surface.

7. The apparatus of claim 1 wherein said tape handler is adapted to move magnetic tape, said tape handler further including a main frame, a vacuum chamber having a tape receiving opening, a tape reel spaced from said tape receiving opening and selectively operable to dispense or receive said tape passing through said tape receiving opening in a selected one of opposite directions, said arcuate guide surface including a recess intermediate said surface portions for receiving said tape direction modifying roller in mating relationship, said roller being mounted on said frame between said tape reel and said tape receiving opening along said tape path so as to define said path substantially in a common plane, a pair of said edge guiding shoulders being positioned at opposite sides of each of said surface portions for guiding said tape both in advance and downstream of said roller, said arcuate guide surface circumscribing a fixed body mounted on said main frame independently of said roller, one of said surface portions and the associated guiding shoulders being aligned with said tape reel, and the other of said surface portions and the associated guiding shoulders being aligned with said tape receiving opening, whereby the required tape alignment is maintained independently of the direction of tape movement.

8. The apparatus of claim 1 wherein said arcuate surface includes a recess intermediate said tape contacting surface portions, said recess receiving said roller in mating relationship.

\* \* \* \* \*

UNITED STATES PATENT OFFICE
CERTIFICATE OF CORRECTION

PATENT NO. : 3,944,122
DATED : March 16, 1976
INVENTOR(S) : Emilio Pellicano

It is certified that error appears in the above-identified patent and that said Letters Patent are hereby corrected as shown below:

Please change the official title on the patent from:

"Device for Guiding the Magnetic Tape in Magnetic Tape Handling Apparatus" to --DEVICE FOR GUIDING A TAPE IN TAPE HANDLING APPARATUS--.

Signed and Sealed this

Seventeenth Day of August 1976

[SEAL]

Attest:

RUTH C. MASON
*Attesting Officer*

C. MARSHALL DANN
*Commissioner of Patents and Trademarks*